Dec. 27, 1938.                N. H. F. OLSEN                2,141,220
                            SPRING CONSTRUCTION
                            Filed Feb. 10, 1936
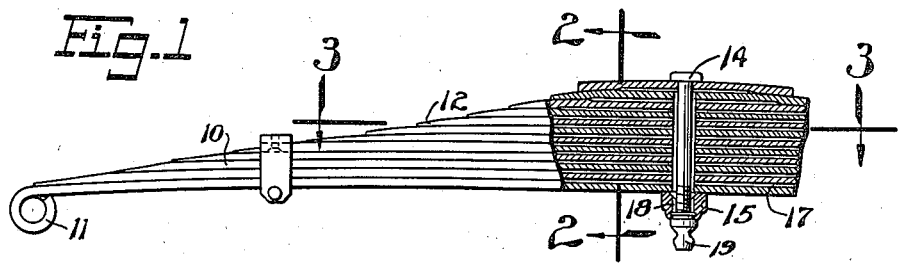
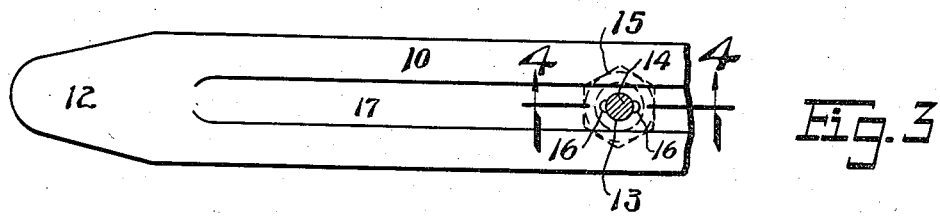
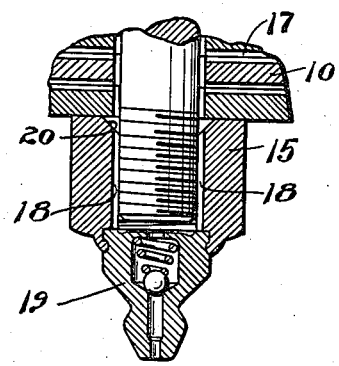          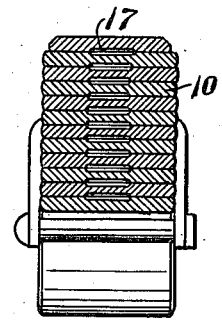
                                                    INVENTOR.
                                                   N. H. F. Olsen
                                              BY
Colvin C. McRae
                                                    ATTORNEY.

Patented Dec. 27, 1938

2,141,220

UNITED STATES PATENT OFFICE 2,141,220

SPRING CONSTRUCTION

Niels H. F. Olsen, Dearborn, Mich., assignor to Ford Motor Company, Dearborn, Mich., a corporation of Delaware Application February 10, 1936, Serial No. 63,121

1 Claim. (Cl. 267—50)

The object of my invention is to provide a spring construction especially suitable for use in connection with motor vehicles. My invention relates to improvements in a leaf type spring and comprises means whereby lubricant may be readily forced between each of the spring leaves to thereby maintain predetermined characteristics for the spring as well as preventing squeaks from friction between the spring leaves. An important feature of this construction is that the lubricant is forced to the extreme outer ends of each of the spring leaves so that the entire bearing surface between each pair of leaves is adequately lubricated.

Still a further object of my invention is to provide a lubricant passageway in the spring which cannot be interrupted by incorrect assembly of the device. Many types of spring lubricators have been suggested in the past but all of such devices, known to the applicant, could be assembled in such manner that the passageways were obstructed. The applicant's spring may only be assembled in the position where lubrication is assured.

With these and other objects in view, my invention consists in the arrangement, construction and combination of the various parts of my improved device, as described in the specification, claimed in my claim and illustrated in the accompanying drawing, in which:

Figure 1 is a side view of my improved spring construction, a portion of the spring being broken away to better illustrate the construction.

Figure 2 is a sectional view, taken on the line 2—2 of Figure 1.

Figure 3 is a sectional view, taken on the line 3—3 of Figure 1, and

Figure 4 is an enlarged sectional view, taken on the line 4—4 of Figure 3.

Referring to the accompanying drawing, I have used the reference numeral 10 to indicate the individual leaves of my improved spring construction. The bottom main leaf, when viewed in the position shown in Figure 1, is formed with an eye 11 on each end thereof, each succeeding leaf being clamped to the convex or compression side of the adjacent leaf and being gradually reduced in length, as in the conventional spring. The ends of each spring leaf are tapered both in width and in thickness, as shown at 12. An opening 13 is provided through the center of each spring leaf and a bolt 14 extends through these openings, the bolt clamping the spring leaves together by means of a nut 15. It is, of course, apparent that the bolt 14 is depended upon to secure the spring leaves together only when the spring is removed from the car. When the spring is fastened to the vehicle, its center portion is rigidly clamped to the frame to thereby secure the spring leaves together independently of the bolt 14.

Referring to Figure 3 it will be seen that the bolt 14 snugly fits the opening 13 to thereby secure accurate lateral alignment of the leaves, and that a pair of grooves 16 are formed respectively in the opposite edges of each opening 13 along the longitudinal center line of each leaf. The grooves 16 form vertical passageways along the sides of the bolt 14 from the bottom leaf up to the top leaf.

Referring to Figures 2 and 3 it will be noted that a channel 17 extends lengthwise along the spring leaves in each side thereof, each of these channels being substantially one third the width of the leaf and being about .010 inch deep. The channels 17 do not extend to the extreme ends of each leaf, the ends of the channels being spaced from the ends of the leaf a distance substantially equal to the width of the spring leaf. It is only necessary that each succeeding spring leaf overlaps the end of the channel in the leaf beneath so as to form a closure for the channel.

In forming channels 17 it is preferable to roll same in both sides of the flat stock from which the springs are made, this rolling operation being performed at the time the spring stock is being rolled. The spring leaves are then cut to length and the ends flattened and tapered, as shown at 12, so that the channels 17 are leveled on both sides of the leaf ends for a distance equal to the length of the tapered end portions 12.

Referring to Figure 4 it will be noted that a nut 15 is provided, this nut having a pair of diametrically opposed grooves 18 therein which extend across the threads from one side to the other. These grooves are, of course, somewhat deeper than the threads. A lubricating fitting 19 forms the closure for the outer end of the nut 15. The inner end of the nut is provided with a counterbored portion 20 which, when the nut is threaded in place, forms an annular chamber which connects on with the grooves 16. The nut 15 is of such length that when the bolt 14 is tightened in position, there is a space between the end of the bolt and the fitting 19.

From the foregoing it will be seen that grease forced into the fitting 19 will flow through the grooves 18, the counterbore 20, then upwardly through the aligned grooves 16 on each side of the bolt 14, and then lengthwise through the channels 17 between each pair of spring leaves.

The advantage of this construction is that grease may be supplied to all of the bearing surfaces between the spring leaves without jacking up the car. Further, the car springs may be greased with the same lubricant and at the same time that the rest of the vehicle is being serviced.

From a structural standpoint, the applicant's device has an advantage over other lubricated springs in that no extra parts are required other than an inexpensive grease fitting.

Still further, the spring is so designed that it cannot be assembled in any position in which it will not function properly. The bolt 14, being of annular cross section, insures that the leaves are laterally aligned.

One of the chief advantages of lubricated springs is that the friction between the spring leaves is constant so that the shock absorbers may be designed for predetermined spring characteristics. When springs are lubricated from the exterior, the friction is a minimum after lubrication and gradually increases until it reaches many times the minimum amount. Consequently, the riding characteristics of the car vary over a wide range between lubrications of these springs. With the applicant's device, the springs are designed to provide the desired flexibility and the shock absorbers are designed to absorb practically all the rebound. There is a sufficient reservoir of grease in the channels 17 to provide lubrication over a period of time several times that between greasings of the car, so that at no time are the spring leaves allowed to become dry.

The most obvious advantage of this construction to the average driver is that the springs do not squeak.

Some changes may be made in the arrangement, construction and combination of the various parts of my improved device without departing from the spirit of my invention, and it is my intention to cover by my claim such changes as may reasonably be included within the scope thereof.

I claim as my invention:

A spring construction comprising, a plurality of leaves each of which is formed from rolled strip stock, said leaves comprising a main leaf which extends the length of said spring with leaves of gradually reduced length clamped to the compression side of said main leaf, each intermediate leaf having a channel extending lengthwise therealong in each side thereof which channels are substantially one-third the width of the spring leaf, each end of each leaf being flattened to a tapered section to thereby terminate the channels in both sides of each leaf, the ends of each leaf extending over the initial portions of the tapered ends of the adjacent longer leaf to form a closure for the ends of said channels, and means for simultaneously conducting lubricant to the center portions of said channels.

NIELS H. F. OLSEN.